H. H. HILL.
Arithmetical-Blocks.
No. 205,960. Patented July 16, 1878.
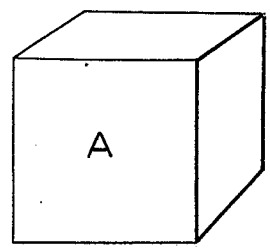
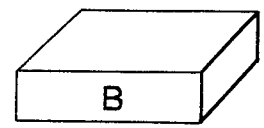
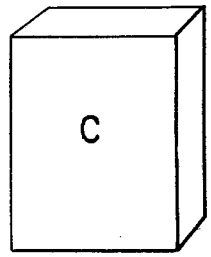
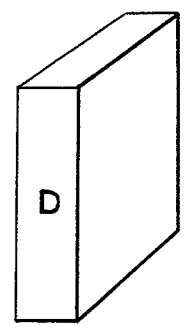
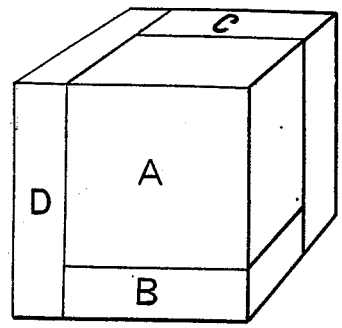
Witnesses:
Isaac Schnurand
Alexander Goldsmith
Inventor:
H. Harrison Hill

UNITED STATES PATENT OFFICE.

H. HARRISON HILL, OF CHICAGO, ILLINOIS.

IMPROVEMENT IN ARITHMETICAL BLOCKS.

Specification forming part of Letters Patent No. 205,960, dated July 16, 1878; application filed January 4, 1878.

*To all whom it may concern:*

Be it known that I, H. HARRISON HILL, of Chicago, in the county of Cook and State of Illinois, have invented a new and useful Improvement in Cube-Root Blocks, which invention is fully set forth in the following specification, reference being had to the accompanying drawings.

The object of my invention is to illustrate, in a simplified manner, the completion of the cube, or the extraction of the cube-root; and the invention consists in the combination of four blocks as follows:

The block A represents the original cube, or the third power of the tens. The block or parallelopiped B, of cubic form, represents the first addition to the original cube, or the product of the square of the tens multiplied by the units. The block or parallelopiped C represents the second addition, or the product of the tens multiplied by the tens and units multiplied by the units. The block or parallelopiped D represents the third addition, or the product of the square of the tens and units multiplied by the units.

The formula of the foregoing being $t^3 + t^2u + t(t+u)u + (t+u)^2u = (t+u)^3$.

It will be seen, therefore, that by my invention the cube is completed by three additions, whereas by the old method seven additions are required.

I claim as my invention—

The arithmetical blocks herein described, consisting of the cubical block A and the parallelopiped-shaped blocks B, C, and D, all constructed and arranged as set forth.

H. HARRISON HILL.

Witnesses:
  ALEXANDER GOLDSMITH,
  C. M. STAIGER.